(12) United States Patent
Ratcliffe

(10) Patent No.: US 6,574,819 B1
(45) Date of Patent: Jun. 10, 2003

(54) METHODS AND DEVICES FOR REMOVING DEW FROM GRASS AREAS SUCH AS GOLF COURSES

(76) Inventor: Robert Ratcliffe, P.O. Box 1299, Montauk Hwy., Bridgehampton, NY (US) 11932

( * ) Notice: Subject to any disclaimer, the term of this patent is extended or adjusted under 35 U.S.C. 154(b) by 35 days.

(21) Appl. No.: 09/599,119

(22) Filed: Jun. 22, 2000

(51) Int. Cl.[7] .................................................. E01H 1/00
(52) U.S. Cl. .................... 15/1; 172/612; 15/3
(58) Field of Search ................................. 15/3; 172/612; 280/480

(56) References Cited

U.S. PATENT DOCUMENTS

| | | |
|---|---|---|
| 1,050,748 A | 1/1913 | Paulsson |
| 1,748,354 A | 2/1930 | Laing |
| 1,954,905 A | 4/1934 | Wheat |
| 2,694,880 A | 11/1954 | Artese et al. |
| 2,825,983 A | 3/1958 | Finn |
| 3,400,628 A | 9/1968 | Herzon |
| 3,594,844 A | 7/1971 | Hargreaves et al. |
| 3,623,397 A | 11/1971 | Hayashi |
| 3,808,739 A | 5/1974 | Newgent |
| 3,954,499 A | * 5/1976 | Canto |
| 4,332,107 A | 6/1982 | Reed |
| 4,471,570 A | 9/1984 | Chandler |
| 4,505,338 A | 3/1985 | Koval et al. |
| 4,513,528 A | 4/1985 | Dale |
| 4,648,352 A | 3/1987 | Smith |
| 4,761,945 A | 8/1988 | Bünger |
| 5,833,013 A | 11/1998 | Davis |

* cited by examiner

*Primary Examiner*—Randall E. Chin
(74) *Attorney, Agent, or Firm*—Galgano & Burke

(57) ABSTRACT

Devices and methods for removing dew from grassy areas, such as golf courses. One embodiment comprises a plurality of beaded lines comprising lead weights which are disposed within an outer synthetic rope sheath. The ends of the flexible elongated member comprise means for attaching the elongated member to at least one and preferably two separate tractors. Dew is removed by connecting at least one of the aforesaid devices to at least one tractor and dragging the device across the grassy area.

16 Claims, 3 Drawing Sheets

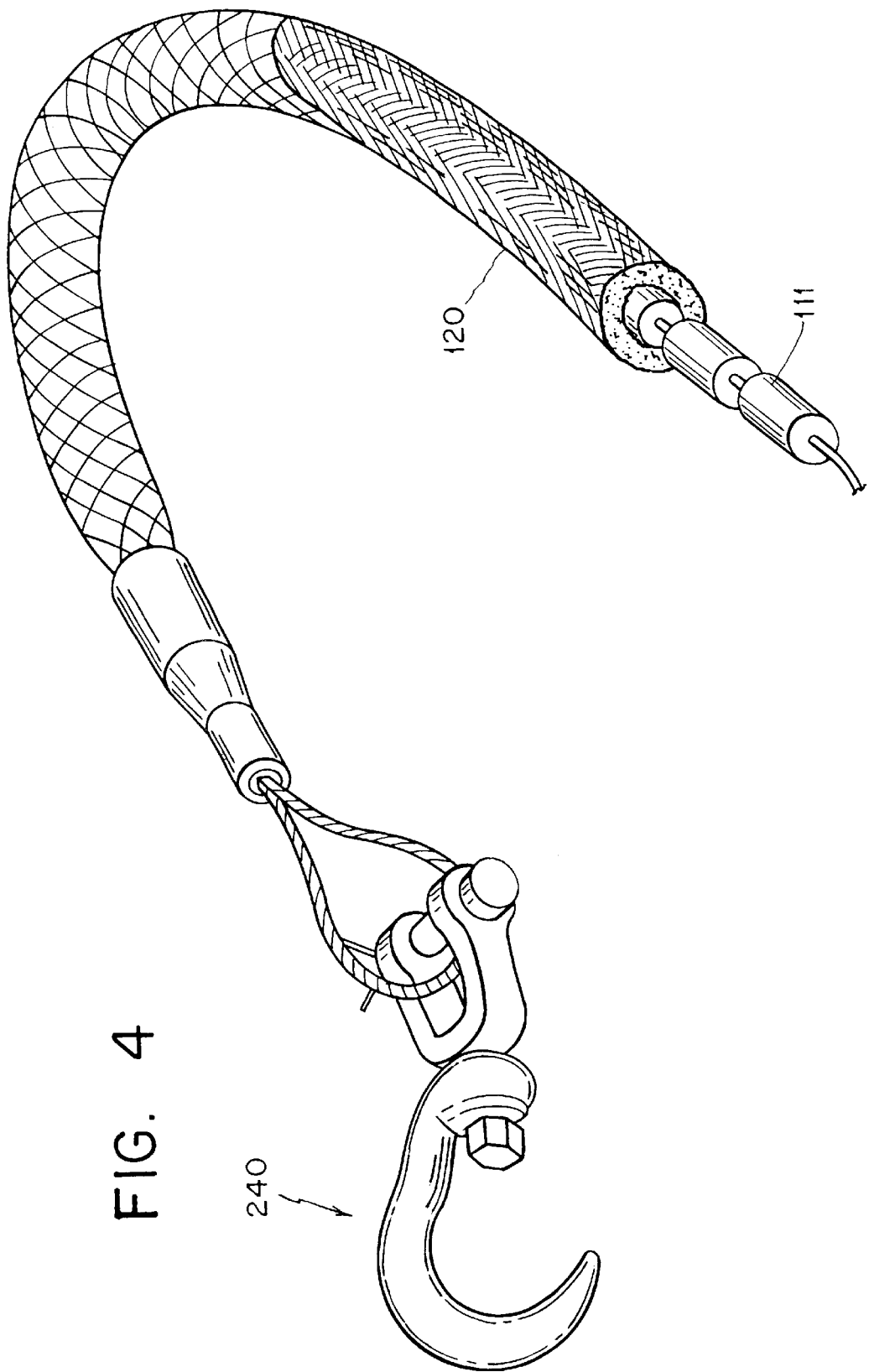

METHODS AND DEVICES FOR REMOVING DEW FROM GRASS AREAS SUCH AS GOLF COURSES

The present invention is related to methods and apparatus for removing dew from grass areas and is particularly useful for removing dew from golf courses.

BACKGROUND OF THE INVENTION

Various devices have been disclosed for removing dew from golf courses. For example, U.S. Pat. No. 3,954,499 to Canto discloses a length of hose for a sweeper body comprising a weight disposed at the far end or in the middle of the sweeper body. U.S. Pat. No. 1,748,354 to Laing discloses a greens whip comprising a steel tubing which is split or slotted at one end. U.S. Pat. No. 2,694,880 to Artese discloses a putting green sweeper. Other devices have also been disclosed for clearing underbrush and debris from a field. Such devices are shown in U.S. Pat. Nos. 1,954,905 to Wheat and to 825,983 to Finn.

Some of these previously disclosed devices are clearly not suitable for simply removing dew and/or small debris such as grass clippings and worm castings from a golf course fairway since, as designed, they would tear up the fairway grass. Those skilled in the art will appreciate that it is desirable to break up and spread out worm castings which can otherwise impede the performance of mower blades. Previously disclosed devices which use hoses also suffered disadvantages in that they did not have weights distributed uniformly over the length of the device. Additionally, by its nature, hose typically has a memory which can cause the hose to skip and jump when it is dragged. Those devices having a weight located at a central portion at the time of their manufacture would require cutting at both ends in order to custom fit to a specific desired length.

It would therefore be desirable to provide methods and devices for removing dew from grass areas comprising weights distributed uniformly over substantially the entire length of the device and which can be readily customized to any desired length.

SUMMARY OF THE INVENTION

Various embodiments of the present invention comprise devices and methods for removing dew from grassy areas, such as golf courses.

One preferred embodiment of the present invention comprises a plurality of beaded lines wherein the "beads" comprise lead weights and the beaded lines are disposed within an outer synthetic rope sheath. The ends of the flexible elongated member comprise means for attaching the elongated member to at least one and preferably two separate tractors.

Methods of the present invention comprise connecting at least one of the aforesaid devices to at least one tractor and dragging the elongated flexible member across the grassy area.

These and other embodiments are described in further detail below.

BRIEF DESCRIPTION OF THE DRAWINGS

FIG. 4 illustrates an alternative embodiment of the present invention.

DETAILED DESCRIPTION

The present invention is directed to improved devices for removing dew from grassy areas and is particularly useful for removing dew from golf courses. The preferred devices of the present invention comprise flexible elongated members which extend, typically from about 100 to 250 feet in length from a first end to a second end. The devices of the present invention are designed to be dragged across the surface of a fairway and are therefore preferably formed of flexible and durable materials.

Figure 1:
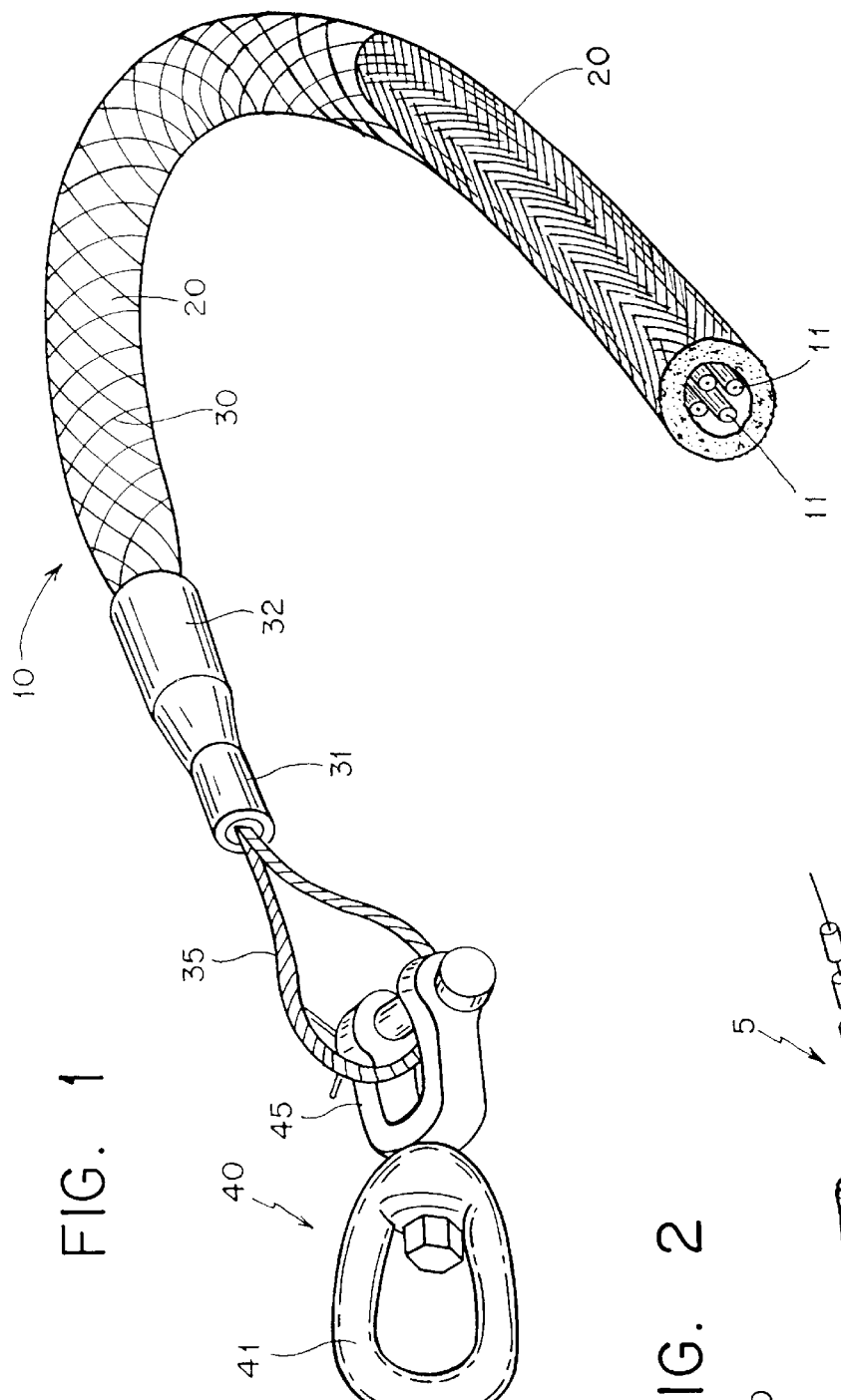
FIG. 1 is a partial view of one preferred embodiment of the present invention.
Figure 2:
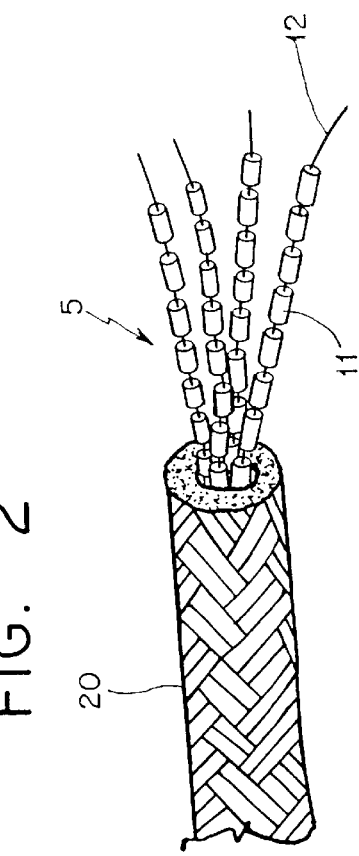
FIG. 2 is a sectional view of a length of the elongated member shown in FIG. 1 with portions of the outer sheath removed.
Figure 3:
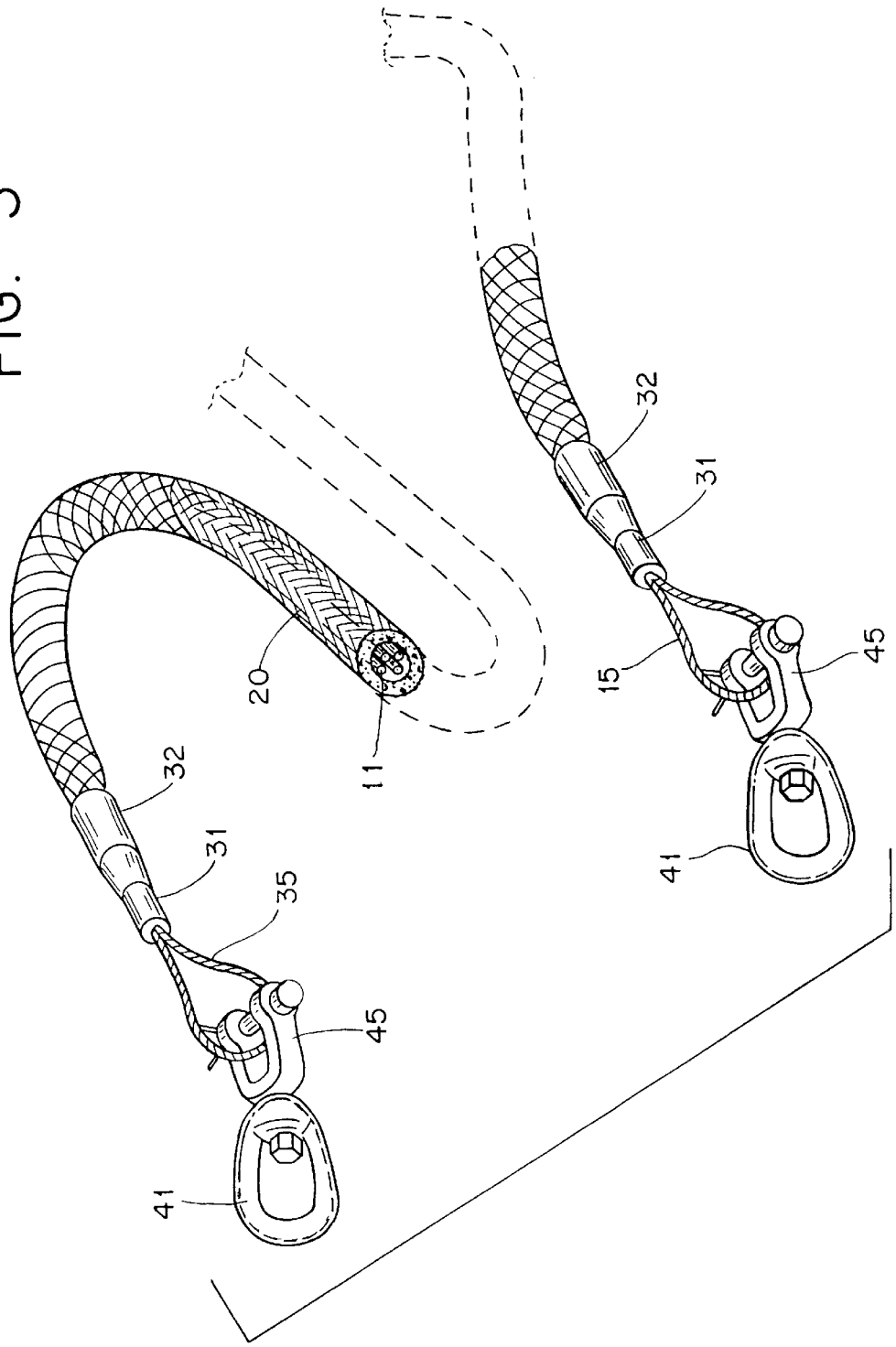
FIG. 3 illustrates a complete device of the embodiment shown in FIGS. 1 and 2.

The preferred embodiment of the present invention, illustrated in FIGS. 1–3, comprises a plurality of beaded lines 5 wherein the "beads" are cylindrical, leaded weights 11 disposed in spaced connection and connected by a resilient, durable strand 12 such as nylon. The lead beads 11 are preferably connected via a common strand 12 as illustrated in FIG. 2. In this preferred illustrated embodiment, four beaded lines 5 are enclosed within a synthetic rope sheath 20 for substantially the entire length of the dew removing device. The synthetic rope is preferably formed of a material which is durable, has high resistance to ultraviolet degradation and has limited "memory" to prevent kinking and skipping if one end is rotated relative to the other end. The desired goal is to maintain constant contact between the devices of the present invention and the grass surface in order to provide uniform removal of dew as well as the break up of grass clippings and worm castings. Those skilled in the art will appreciate that if a typical garden-type hose is utilized, the hose typically has memory such that if one end of the hose is rotated relative to the other end, the hose will tend to curl up in one or more locations and therefore not maintain uniform, continuous contact with the grass.

One suitable synthetic rope is marketed under the name POLYSTEEL by Novatec Braids Ltd. of Yarmouth, Novia Scotia.

With reference to FIG. 1, which illustrates an end portion of a dew removing device 10 of the present invention, the terminal ends of the flexible, elongated member is provided with a kellum connector comprising a self-tightening wire braid 30 which extends over a section, for example, 4–10 inches, of the synthetic rope sheath 20. The wire braid 30 acts as a gripping portion which grabs the drag line and, at the opposite end, terminates in a cable loop 35 with suitable connectors 31 and 32 in between. The gripping portion acts as a self-tightening connector since as greater pulling force is exerted on the cable loop 35, the wire braid 30 tightens around rope sheath 20.

Though not necessary to the practice of the present invention, the illustrated preferred embodiment also advantageously comprises a swivel connector 40 comprising a heavy duty eye 41 for attachment to a vehicle, a stationary object such as a stake, etc. The swivel connector is connected to the loop 35 of the kellum connector with a clevis pin connector 45.

FIG. 3 illustrates a coiled length of a complete dew removing device 10 of the present invention showing two swivel connectors, one on either end of the drag line.

FIG. 4 illustrates an alternative embodiment of the present invention comprising a single beaded line comprising larger lead weights 111 disposed within a synthetic rope sheath 120. Thus, from the present description and drawings, it will be appreciated that different numbers of beaded lines can be used within the scope of the present invention. It is also within the scope of the present invention to use other forms of weights with alternative embodiments of the present invention. However, it is most desirable to provide a uniform distribution of weight over substantially the entire length of the device, most preferably the entire length of the device, with the exception of the terminal connectors, and to use internal weights which will not cause kinking or skipping of the device due to the inherent memory of the internal weights or external sheath.

As illustrated in FIG. 4, another embodiment of the present invention comprises a hook 240 located at the terminal end of the drag line for connection to a tractor.

According to preferred methods of removing dew from a grassy area, such a fairway, each end of a dew removal device is connected to a tractor and the tractors are driven down opposite sides of a fairway. The relatively movable inner weights of the preferred illustrated embodiments of the present invention advantageously maintain the drag line on the grass to provide continuous dew removal. While the use of two vehicles is preferred, it is also possible to utilize the present invention by attaching one end to a fixed object, such as a stake in the ground or a tree, extending the opposite end to a location spaced from the fixed object, and then dragging the drag line over the area between the fixed end and the movable end.

What is claimed is:

1. A device useful for removing dew from a surface comprising:
   at least one flexible, elongated inner member comprising at least one beaded line comprising a plurality of relatively movable, connected weights;
   a flexible, elongated outer sheath substantially surrounding said inner member comprising a first end and a second end; and
   means for selectively connecting said first end to a vehicle.

2. A device useful for removing dew from a surface according to claim 1 wherein said weights are lead weights.

3. A device useful for removing dew from a surface according to claim 1 wherein said weights are lead weights substantially evenly distributed over the length of said inner member.

4. A device useful for removing dew from a surface according to claim 1 wherein said outer sheath comprises a rope.

5. A device useful for removing dew from a surface according to claim 4 wherein said outer sheath comprises a synthetic rope.

6. A device useful for removing dew from a surface according to claim 1 wherein said outer sheath comprises a synthetic rope.

7. A device useful for removing dew from a surface according to claim 6 wherein said outer sheath comprises a polymeric material.

8. A device useful for removing dew from a surface according to claim 1 wherein said connecting means comprises a connector which tightens around said outer sheath upon the application of force away from said sheath.

9. A device useful for removing dew from a surface according to claim 8 wherein said connecting means comprises a swivel connector.

10. A device useful for removing dew from a surface according to claim 8 wherein said connecting means comprises a loop.

11. A device useful for removing dew from a surface according to claim 8 wherein said connecting means comprises a hook.

12. A device useful for removing dew from a surface according to claim 1 wherein said connecting means comprises a swivel connector.

13. A device useful for removing dew from a surface according to claim 1 wherein said connecting means comprises a loop.

14. A device useful for removing dew from a surface according to claim 1 wherein said connecting means comprises a hook.

15. A device useful for removing dew from a surface according to claim 1 comprising a plurality of said inner members.

16. A device useful for removing dew from a surface comprising:
   at least three flexible, elongated inner members comprising a plurality of relatively movable, connected weights;
   a flexible, elongated outer sheath substantially surrounding said inner member comprising a first end and a second end; and
   means for selectively connecting said first end to a vehicle.

* * * * *